United States Patent
Miyashita (10) Patent No.: US 7,350,701 B2
(45) Date of Patent: Apr. 1, 2008

(54) PORTABLE APPARATUS AND ITS METHOD OF UNLOCKING WITH NEW SIMPLIFIED PIN CODE

(75) Inventor: Yukio Miyashita, Tokyo (JP)

(73) Assignee: NEC Corporation, Tokyo (JP)

( * ) Notice: Subject to any disclaimer, the term of this patent is extended or adjusted under 35 U.S.C. 154(b) by 356 days.

(21) Appl. No.: 11/147,940

(22) Filed: Jun. 8, 2005

(65) Prior Publication Data

US 2005/0274796 A1  Dec. 15, 2005

(30) Foreign Application Priority Data

Jun. 14, 2004  (JP)  ............... 2004-175012

(51) Int. Cl.
*G06K 5/00* (2006.01)
(52) U.S. Cl. ............... 235/382; 235/380
(58) Field of Classification Search ........ 235/380, 235/375, 382, 382.5, 492, 486; 455/411, 455/410, 550.1; 705/26; 340/5.62, 10.1
See application file for complete search history.

(56) References Cited

U.S. PATENT DOCUMENTS

| 4,945,556 | A | | 7/1990 | Namekawa |
|---|---|---|---|---|
| 5,931,948 | A | * | 8/1999 | Morisawa et al. ............ 726/19 |
| 6,052,408 | A | * | 4/2000 | Trompower et al. ......... 375/141 |
| 6,085,337 | A | * | 7/2000 | Mattheis et al. .............. 714/30 |
| 6,400,255 | B1 | * | 6/2002 | Ohnishi et al. ............ 340/5.62 |
| 6,560,274 | B1 | | 5/2003 | Leitgeb et al. |
| 2001/0016486 | A1 | * | 8/2001 | Ko ............................. 455/411 |
| 2003/0055735 | A1 | * | 3/2003 | Cameron et al. ............. 705/26 |
| 2004/0013269 | A1 | * | 1/2004 | Du et al. ..................... 380/284 |
| 2004/0049697 | A1 | | 3/2004 | Edwards, Jr. et al. |

(Continued)

FOREIGN PATENT DOCUMENTS

EP  1 246 434 A1  10/2002

(Continued)

OTHER PUBLICATIONS

European Search Report, European Patent Application No. 05 01 1848, dated Dec. 12, 2005.

*Primary Examiner*—Thien Minh Le
(74) *Attorney, Agent, or Firm*—Michael Best & Friedrich LLP (57) ABSTRACT

A method of unlocking at least one of functions provided to a portable apparatus is provided which includes: judging whether or not an predetermined first code is entered; second judging whether or not a predetermined second code is entered, wherein the character length of the predetermined first code is shorter than the character length of the predetermined second code, if the predetermined first code is not entered; and unlocking the one of functions provided to the portable apparatus, if the predetermined first or second code is entered. A portable apparatus with plurality of functions is provided which includes: a controlling means for setting a first code and a second code; and a storing means for storing the first code and the second code, wherein the controlling means judges whether or not the first code is entered; the controlling means judges whether or not the second code is entered, where in the character length of the first code is shorter than the character length of the second code, if the first code is not entered; and the controlling means unlocks at least one of functions provided to the portable apparatus, if the first or second code is entered.

24 Claims, 9 Drawing Sheets

U.S. PATENT DOCUMENTS

2004/0054929 A1* 3/2004 Serpa ................ 713/202
2004/0082322 A1   4/2004 Tani
2005/0117632 A1* 6/2005 Sun .................... 375/150
2006/0197685 A1* 9/2006 Wormald ............. 341/22

FOREIGN PATENT DOCUMENTS

JP       2003-141087       5/2003

* cited by examiner

PORTABLE APPARATUS AND ITS METHOD OF UNLOCKING WITH NEW SIMPLIFIED PIN CODE

This application is based upon and claims the benefit of priority from Japanese Patent Application No. 175012/2004 filed on Jun. 14, 2004, the content of which are incorporated by reference.

BACKGROUND OF THE INVENTION

1. Field of the Invention

The present invention relates to a portable apparatus and its method of protecting personal information stored in the portable apparatus and, more specifically, to a portable apparatus and its method of unlocking with the new personal identification number (PIN) code.

2. Description of the Related Art

As an example of portable apparatuses, a conventional mobile phone locks all or a part of its functions so as to protect personal information, such as phone numbers and e-mail addresses, or so as to prevent a person who is not the normal user from accessing contents or calling. For example, Japanese Patent Laid-open Application Publication No. 141087/2003 (hereinafter, referred to as "related art") discloses a mobile phone which requires an input of a four-digit personal identification number (PIN) code to be unlocked.

However, the mobile phone described in the related art have a problem that its user is forced to perform a troublesome operation of inputting a four-digit PIN code in order to unlock it. With considering how frequent a mobile phone is used, this problem detract the convenience of the mobile phone largely.

In addition, the mobile phone described in the related art has a problem that it is required to input a four-digit PIN code equally for unlocking any function while the importance of the locked function may vary depending on the function.

On the other hand, in order to solve these problems, the digit number of a PIN code can simply be reduced. In this case, however, there is a security problem since a probability that a number which a person who is not the normal user randomly inputs coincides accidentally with the right PIN code increases exponentially depending on the reduced digit number.

SUMMARY OF THE INVENTION

An object of the present invention is to provide a portable apparatus and its method which solve at least one of the above-mentioned problems.

Furthermore, another object of the present invention is to provide a portable apparatus and its method in which user-friendliness or convenience is improved while keeping its security level.

Moreover, still another object of the present invention is to provide a portable apparatus and its method in which a user can set a PIN code with which she/he can unlock the portable apparatus easily.

In addition, still another object of the present invention is to provide a portable apparatus and its method in which the burden of a user memorizing a PIN code to unlock the portable apparatus can be reduced.

Another object of the present invention is to provide a portable apparatus and its method in which the burden of a user unlocking the portable apparatus can be reduced by making unlocking operation simpler.

Furthermore, still another object of the present invention is to provide a portable apparatus and its method in which the burden of a user can be reduced by providing the new setting operation of a PIN code to make the unlocking operation simpler.

Moreover, still another object of the present invention is to provide a portable apparatus and its method in which every function can be unlocked with a different pattern.

In addition, still another object of the present invention is to provide a portable apparatus and its method in which each function can be locked in a way according the importance by unlocking the portable apparatus with a different PIN code.

Moreover, still another object of the present invention is to provide a portable apparatus and its method in which a user can unlock the portable apparatus more simply than in the conventional portable apparatus and the conventional method and more securely than to reduce merely a digit number of a PIN code.

The present invention provides a method of unlocking at least one of functions provided to a portable apparatus, comprising: judging whether or not an predetermined first code is entered; second judging whether or not a predetermined second code is entered, wherein the character length of the predetermined first code is shorter than the character length of the predetermined second code, if the predetermined first code is not entered; and unlocking the one of functions provided to the portable apparatus, if the predetermined first or second code is entered. Characters of the predetermined first code may preferably be identical to designated several characters included in the predetermined second code. The designated several characters of the predetermined first code may preferably be consecutive characters in sequence of characters included in the predetermined second code. The consecutive characters may preferably be left most characters of the predetermined second code. The consecutive characters may preferably be rightmost characters of the predetermined second code. The consecutive characters may preferably be center characters of the predetermined second code. The character may preferably be a numeral number. The portable apparatus may preferably be a mobile phone. Sequence of characters included in the predetermined first and second codes may preferably be changeable to another sequence of characters. Each different sequence of characters included in the predetermined first and second codes may preferably be assignable to each of the functions provided to the portable apparatus, respectively. Each different sequence of characters included in the predetermined first and second codes may preferably be assignable to each of selected plurality of functions among the functions provided to the portable apparatus. The method may further comprise; selecting an unlocking mode wherein the predetermined first code is not used.

The present invention also provides a portable apparatus with plurality of functions, comprising: a controlling means for setting a first code and a second code; and a storing means for storing the first code and the second code, wherein the controlling means judges whether or not the first code is entered; the controlling means judges whether or not the second code is entered, wherein the character length of the first code is shorter than the character length of the second code, if the first code is not entered; and the controlling means unlocks at least one of functions provided to the portable apparatus, if the first or second code is entered. Characters of the first code may preferably be identical to designated several characters included in the second code. The designated several characters of the first code may preferably be consecutive characters in sequence of characters included in the second code. The consecutive characters may preferably be leftmost characters of the second code. The consecutive characters may preferably be rightmost characters of the second code. The consecutive characters may preferably be center characters of the second code. The character may preferably be a numeral number. The apparatus may preferably be a mobile phone. Sequence of characters included in the first and second codes may preferably be changeable to another sequence of characters. Each different sequence of characters included in the first and second codes may preferably be assignable to each of the functions provided to the portable apparatus, respectively. Each different sequence of characters included in the first and second codes may preferably be assignable to each of selected plurality of functions among the functions provided to the portable apparatus. The controlling means selects an unlocking mode wherein the first code may preferably be not used.

According to the present invention, if a user considers that a security level of a PIN code input having been used as unlocking means in a conventional portable apparatus is excessive, she/he can unlock a portable apparatus by an input of a simplified PIN code by setting the simplified PIN code as a first stage of PIN code. Hence, operation for unlocking a mobile phone is simplified, operability improves, and the burden of a user is reduced. In addition, in the present invention, since a portable apparatus requests a user to input a PIN code for a second stage in the second time or later when the authentication of a simplified PIN code is unsuccessful, high security is assured with considering a few digit number of a simplified PIN code.

According to the present invention, in a portable apparatus, since a user can set a PIN code easily, the convenience of the portable apparatus improves. When memorizing a PIN code, the burden of a user is reduced.

According to the present invention, in a portable apparatus, each user can select which function to be locked according to self-needs, and hence, can use the portable apparatus further suitable for self-needs.

According to the present invention, in a portable apparatus, a user can use a PIN code which depends on the function, and hence, can determine a security level according to the importance of each function.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

1. Functional Block Diagram of a Mobile Phone According to a First Exemplary Embodiment One of the features of the present invention is to use two PIN codes called a PIN code for a first stage, and a PIN code for a second stage, and a digit number of the PIN code for a first stage is smaller than a digit number of the PIN code for a second stage. For example, the digit number of the PIN code for a first stage is one to three and the digit number of the PIN codes for a second stage is four. For this reason, the PIN code for a first stage is also called a simplified PIN code. The PIN code for a second stage is also called a four-digit PIN code.

As a first exemplary embodiment of the present invention, a mobile phone will be described below. The mobile phone of the first exemplary embodiment of the present invention uses a simplified PIN code different from a four-digit PIN code so as to unlock the mobile phone, that is, uses the simplified PIN code as a PIN code for a first stage, and the four-digit PIN code as a PIN code for a second stage, respectively.

In the mobile phone of the first exemplary embodiment of the present invention, it is fixed which function is locked when locked, and a user cannot set or change which function is locked when locked. In addition, the mobile phone of the first exemplary embodiment of the present invention can also be configured so that all the functions may be locked. When the mobile phone of the first exemplary embodiment of the present invention is locked, nobody can access apart or all of functions of the mobile phone until a lock is released.

Figure 1:
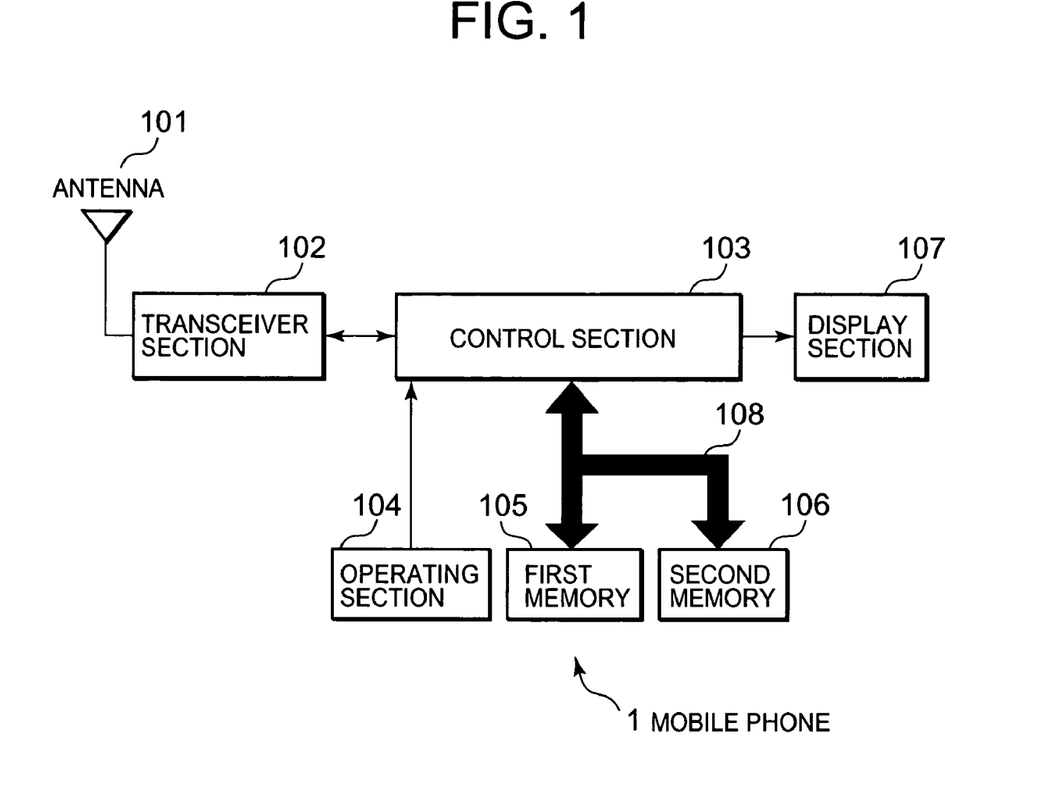
FIG. 1 is a functional block diagram explaining a mobile phone according to a first exemplary embodiment of the present invention.

FIG. 1 is a functional block diagram explaining a mobile phone according to a first exemplary embodiment of the present invention. In FIG. 1, a mobile phone 1 includes an antenna 101, a transceiver section 102, a control section 103, an operating section 104, first memory 105, and second memory 106.

Since the antenna 101 and transceiver section 102 are the same as those of an ordinary mobile phone, detailed explanation of them will be omitted.

The control section 103 controls the setting of the PIN code for a first stage for first authentication and the PIN code for a second stage for second authentication, and the locking and unlocking of the mobile phone. The control section 103 also controls transmission and reception.

The first memory 105 comprises RAM (Random Access Memory) The first memory 105 is used for temporarily storing data when the control section 103 executes a program. The first memory 105 also stores temporarily the PIN code for a first stage or the PIN code for a second stage.

The second memory 106 comprises rewritable nonvolatile memory. The second memory 106 stores a program which operates the mobile phone 1, and the above-mentioned PIN code for a first stage, and the above-mentioned PIN code for a second stage.

A bus 108 connects the control section 103, first memory 105, and second memory 106.

Figure 2:
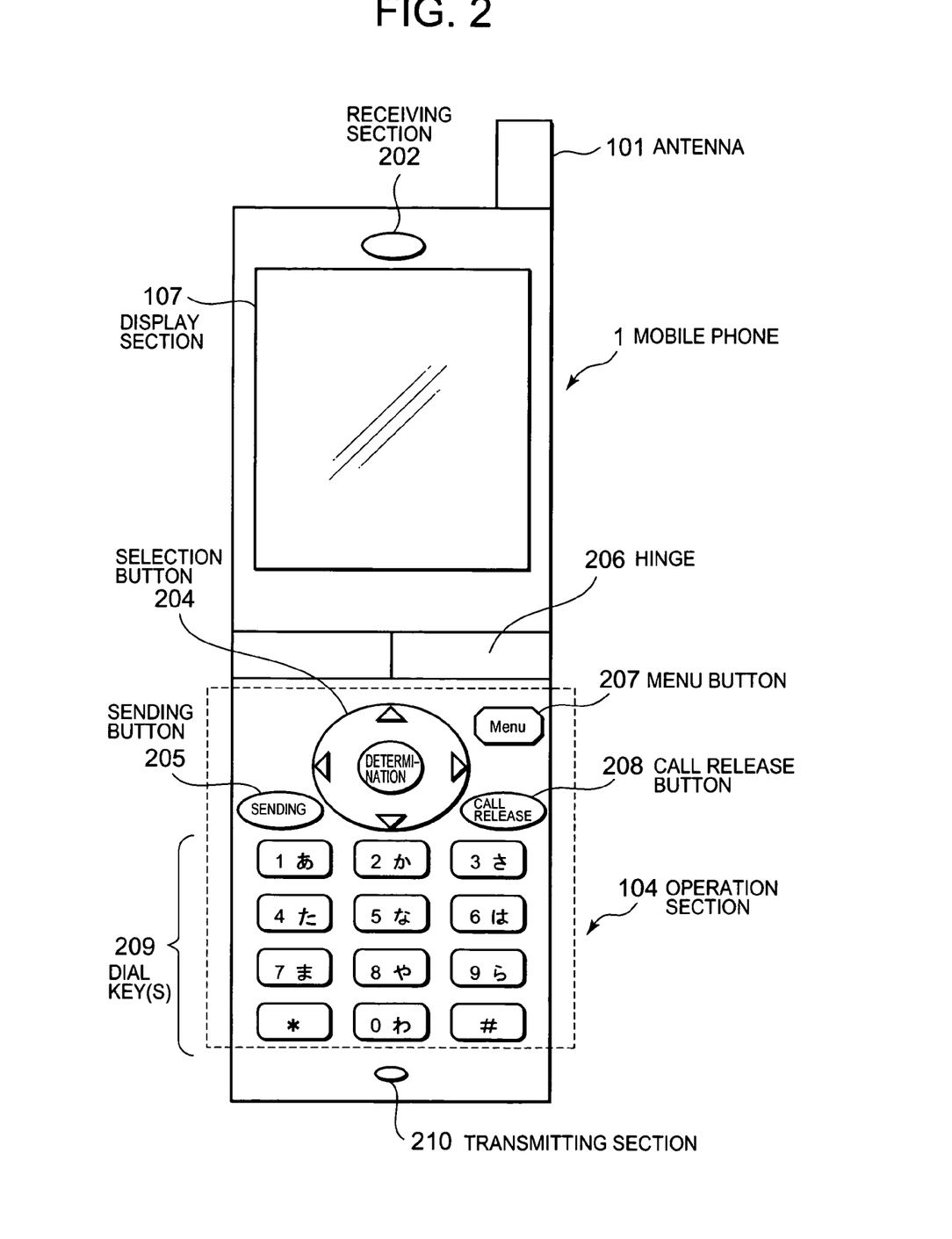
FIG. 2 is an external view of a mobile phone according to a first exemplary embodiment of the present invention.

2. External View of a Mobile Phone According to the First Exemplary Embodiment FIG. 2 is an external view of a mobile phone according to a first exemplary embodiment of the present invention. In FIG. 2, this mobile phone 1 includes the antenna 101, a receiving section 202, the display section 107, a hinge 206, a transmitting section 210, and the operating section 104. The operating section 104 includes, for example, a selection button 204, a sending button 205, a menu button 207, a call release button 208, and dial keys 209. About the same ones as the configurations described in FIG. 1 among the configurations described in FIG. 2, the same reference numbers as those in FIG. 1 are assigned also in FIG. 2. Since these configurations are the same as those of an ordinary mobile phone, the detailed explanation of them is omitted.

3. Setting PIN Code in a Mobile Phone According to the First Exemplary Embodiment FIG. 3 is a flow chart explaining a processing for setting a PIN code, more particularly for setting a simplified PIN code for unlocking a mobile phone according to the first exemplary embodiment of the present invention.

Default values are first set in the four-digit PIN code and simplified PIN code of the first exemplary embodiment of the present invention. In the first exemplary embodiment, a scene where a user changes the PIN code from a default value to the value specified by the user will be described. In addition, as an example, for simplification of a menu function of a mobile phone, the mobile phone of the first exemplary embodiment is configured so that both the four-digit PIN code and simplified PIN code may always be changed when a change function of a PIN code is selected.

Figure 3:
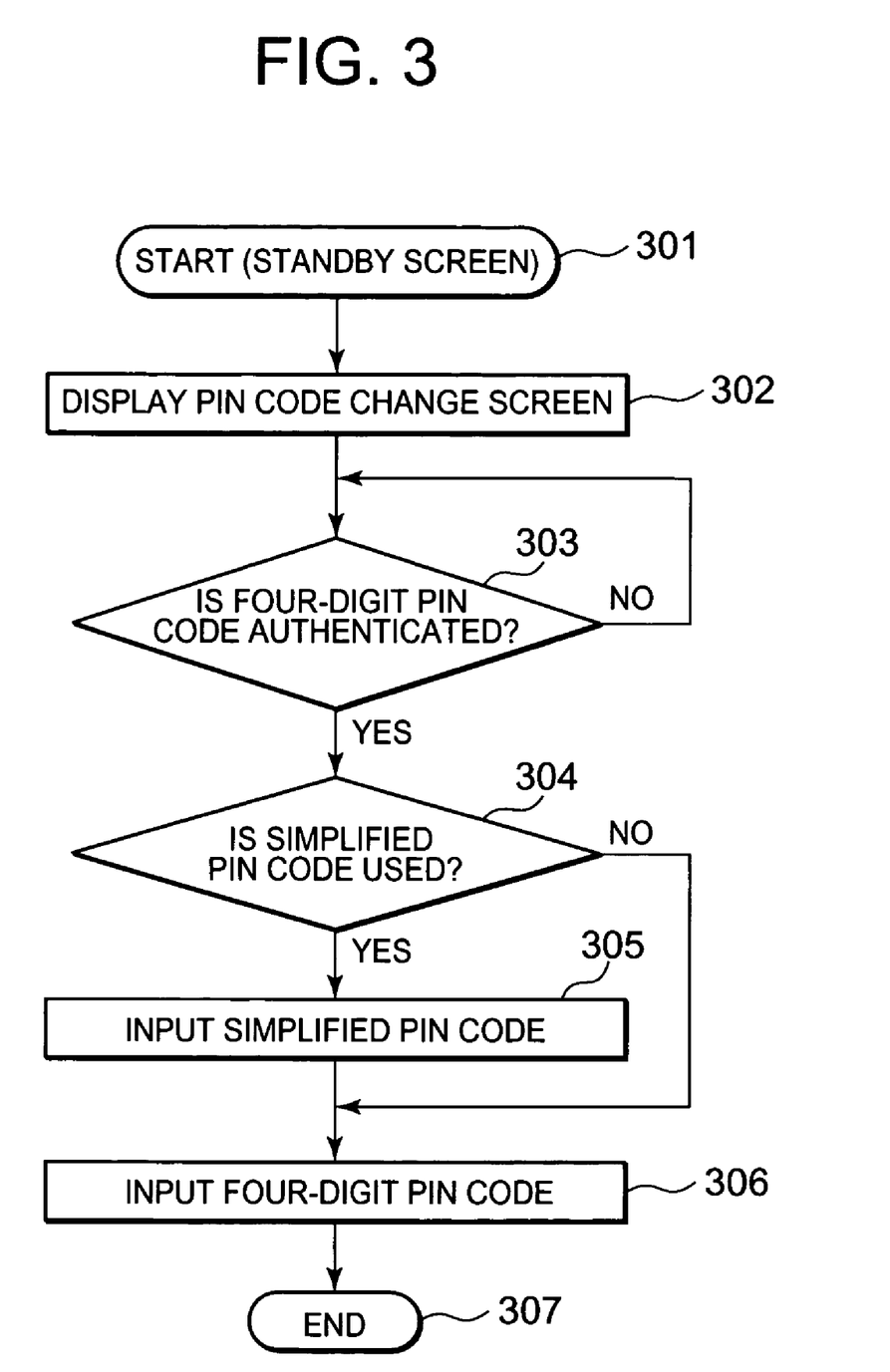
FIG. 3 is a flow chart explaining a process for setting a PIN code, more particularly for setting a simplified PIN code for unlocking a mobile phone according to a first exemplary embodiment of the present invention.

In FIG. 3, a standby screen is displayed on the display section 107 (step 301). At step 301, when a user of the mobile phone 1 pushes the menu button 207, a menu screen is displayed on the display section 107. Further, when the user operates a predetermined key, for example, the selection button 204 or dial keys 209 and the change function of a PIN code is selected, a screen for changing the PIN code is displayed on the display section 107 (step 302). However, since the change of the PIN code is very important function on security, even if the mobile phone 1 is not locked, the four-digit PIN code which is first stored in the second memory 106 is copied to the first memory 105, and thereafter, a screen which prompts the user to input the four-digit PIN code is displayed on the display section 107 (step 303). For example, when the dial keys 209 are operated and a four-digit PIN code is inputted, the inputted four-digit PIN code is stored in the first memory 105, and the inputted four-digit PIN code is compared with the four-digit PIN code copied in the first memory 105 (step 303). When both do not coincide (in the case of NO at step 303), the screen which prompts the user to input the four-digit PIN code is again displayed on the display section 107 (step 303). When both coincide (in the case of YES at step 303), the screen which makes a user select whether a simplified PIN code is used, that is, whether it goes to the screen for changing the simplified PIN code is displayed on the display section 107 (step 304).

When the user selects "Not used" of a simplified PIN code (in the case of NO at step 304), it is not necessary to change the simplified PIN code, and hence, the process shifts to a screen for an input of a four-digit PIN code (step 306), that is, changing the four-digit PIN code.

When the user selects "Used" of a simplified PIN code (in the case of YES at step 304), it is desirable for a user to set and change the simplified PIN code anew, and hence, a screen which prompts, the user to input the simplified PIN code is displayed on the display section 107 and, for example, the dial keys 209 are operated and the simplified PIN code is inputted (step 305). The inputted simplified PIN code is overwritten and stored into the second memory 106 to be changed. Thereby, while the simplified PIN code is changed after that, the mobile phone enters into a mode where the simplified PIN code is used.

At step 306, the dial keys 209 are operated and the four-digit PIN code is inputted (step 306). When the inputted four-digit PIN code is overwritten and stored into the second memory 106 to be changed, the setting processing of a PIN code ends (step 307).

Since the setting of a PIN code is very important on security, it is desirable that the PIN code which the display section 107 prompts a user to input at step 303 is not a simplified PIN code but a four-digit PIN code.

Although default values are first set in the four-digit PIN code and simplified PIN code of the first exemplary embodiment of the present invention, they may be blank at first. In this case, step 303 is skipped.

For simplification of the menu function of a mobile phone, the mobile phone of the first exemplary embodiment is configured so that both codes may be always set when the change function of a PIN code is selected (steps 304 to 306). Nevertheless, it is also sufficient to make it possible that the change function of a simplified PIN code and the change function of a four-digit PIN code are made different functions, and a user selects and calls these independently. In this case, the usage start of the simplified PIN code may be a part of the change function of the simplified PIN code, and may be also made another menu.

4. Locking a Mobile Phone According to the First Exemplary Embodiment

Figure 4:
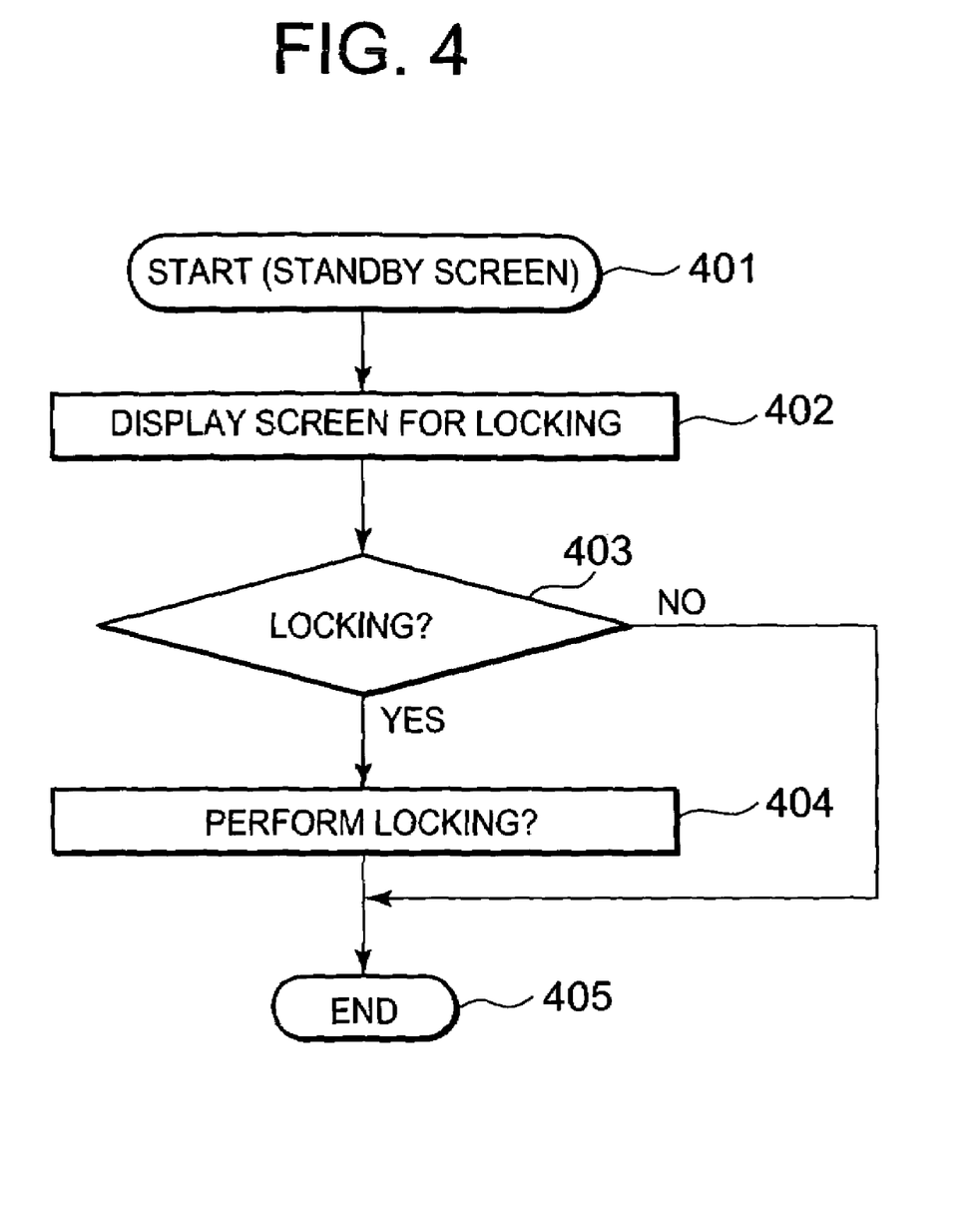
FIG. 4 is a flow chart explaining a process for locking a mobile phone according to a first exemplary embodiment of the present invention.

FIG. 4 is a flow chart explaining a process for locking a mobile phone according to a first exemplary embodiment of the present invention.

In FIG. 4, a standby screen is displayed on the display section 107 (step 401). At step 401, when the user of the mobile phone 1 pushes the menu button 207, the menu screen is displayed on the display section 107. Further, when the user operates a predetermined key, for example, the selection button 204 or dial keys 209, and selects a lock function of the mobile phone, a screen for locking the mobile phone, for example, a screen such as "If locking your mobile phone, press 1, or if not, press 2" is displayed (step 402). A screen for locking the mobile phone, that is, a screen for confirming whether all the function of this mobile phone 1 or a part of functions which were determined beforehand may be really locked to the user is displayed on the display section 107 (step 403). When the user selects "Lock", that is, 1 (in the case of YES at step 403), the mobile phone 1 is locked (step 404) and the setting processing ends (step 405).

At step 403, when the user selects "No lock", that is, 2 (in the case of NO at step 403), the processing shifts to the end of setting (step 405).

Alternatively, the mobile phone 1 of the first exemplary embodiment of the present invention may be configured so as to be locked by a user continuing to press one or more specific keys among the dial keys 209, sending key 205, call release key 208, and menu key 207 for the time beyond a threshold value (e.g., 2 seconds). Or, the mobile phone 1 of the first exemplary embodiment of the present invention may be also configured so as to be locked by a user pressing a specific key and consecutively pressing or continuing to press a specific key among the dial keys 209, sending key 205, call release key 208, and menu key 207.

5. Unlocking a Mobile Phone According to the First Exemplary Embodiment

Figure 5:
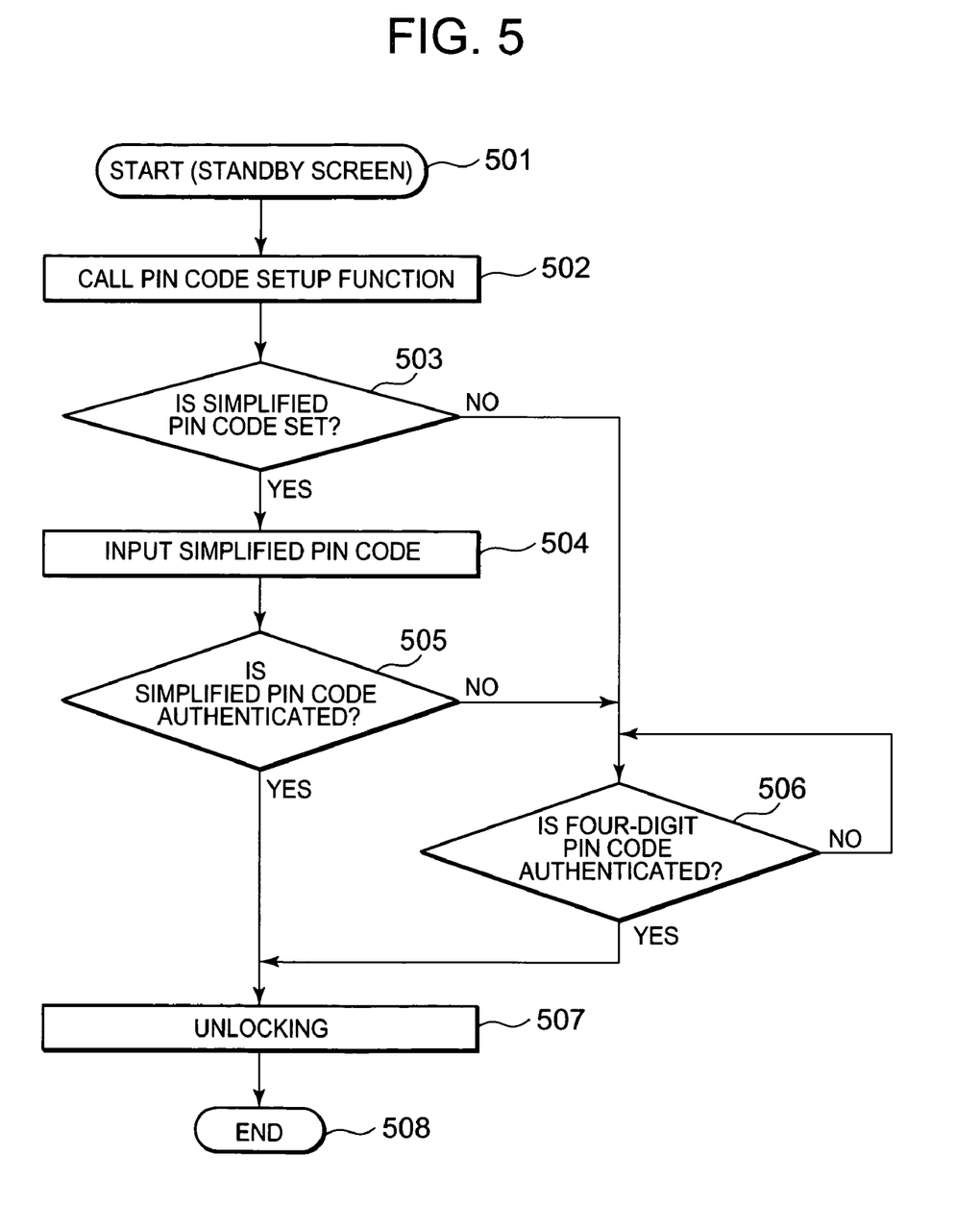
FIG. 5 is a flow chart explaining a process for unlocking a mobile phone according to a first exemplary embodiment of the present invention in case that a simplified PIN code is used.

The release operation of a lock is below described by making as an example the case where all or a part, which were determined beforehand, of functions among a plurality of functions such as a telephone directory function which a mobile phone has are locked. When all functions are locked, even if a user selects which function, the release operation (steps 502 to 507) of this lock is performed. When a user selects a function locked when a part of functions determined beforehand are locked, the release operation (steps 502 to 507) of this lock is performed.

FIG. 5 is a flow chart explaining a process for unlocking a mobile phone according to a first exemplary embodiment of the present invention in case that a simplified PIN code is used.

In FIG. 5, a standby screen is displayed on the display section 107 (step 501). At step 501, when the user of the mobile phone 1 pushes the menu button 207, a menu screen is displayed on the display section 107. Furthermore, when a function selected by the user operating a predetermined key, for example, the selection button 204 or dial keys 209 is locked with the PIN code, that is, the PIN code is set (step 502), the following processing is performed.

At step 503, it is judged whether a simplified PIN code is set, that is, whether a mode of using the simplified PIN code is (step 503). In the case of the mode of using the simplified PIN code (in the case of YES at step 503), after the simplified PIN code stored in the second memory 106 is copied into the first memory 105, a screen which prompts the user to input the simplified PIN code is displayed on the display section 107. For example, when the dial keys 209 are operated and the simplified PIN code is inputted (step 504), the simplified PIN code inputted is stored in the first memory 105, and the simplified PIN code inputted is compared with the simplified PIN code copied in the first memory 105 (step 505). When both coincide (in the case of YES at step 505), a lock is released (step 507) and unlocking processing ends (step 508).

In the case of the mode of not using the simplified PIN code at step 503 (in the case of NO at step 503) or failure of authentication of the simplified PIN code (in the case of NO at step 505), after the four-digit PIN code stored in the second memory 106 is copied into the first memory 105, a screen which prompts the user to input the four-digit PIN code is displayed on the display section 107. For example, when the dial keys 209 are operated and the four-digit PIN code is inputted, the inputted four-digit PIN code is stored in the first memory 105, and the four-digit PIN code copied to the first memory 105 is compared with the inputted four-digit PIN code (step 506). When both coincide (in the case of YES at step 506), a lock is released (step 507) and unlocking processing ends (step 508). When both do not coincide (in the case of NO at step 506), the screen which prompts the user to input the four-digit PIN code is again displayed on the display section 107 (step 506).

At step 501, when a function selected by the user operating a predetermined key, for example, the selection button 204 or dial keys 209 is not locked with the PIN code, that is, the PIN code is not set, steps 502 to 507 are omitted, and the processing ends (step 508).

When the processing ends, a screen for executing the selected function is displayed on the display section 107.

In almost all cases, a user of this mobile phone 1 can release a lock by inputting the PIN code for a first stage with a small digit number. Hence, the user-friendliness of this mobile phone 1 improves in comparison with a conventional mobile phone which uses only a four-digit PIN code. In addition, since the control section 103 moves to the authentication of a PIN code for a second stage when the authentication of the PIN code for a first stage is unsuccessful, this mobile phone 1 has few problems on security. Thus, supposing a PIN code is simply the numerical value with two digits in a conventional mobile phone, even if a user does not know a right PIN code, it is possible to release a lock so long as the user inputs the PIN code 100 times at the maximum. On the other hand, in the mobile phone 1 of the first exemplary embodiment of the present invention, after a user who does not know a right PIN code fails in the authentication of, for example, the simplified PIN code of a numerical value with two digits once (in the case of NO at step 505), the process shifts to the authentication of the four-digit PIN code (step 506). Hence, it is not possible to release a lock unless the user inputs the four-digit PIN code 10000 times at the maximum. Of course, it is also sufficient to adopt such configuration that, when the authentication of the simplified PIN code or four-digit PIN code is unsuccessful, for example, three consecutive times, the use of the mobile phone is inhibited. When configured in this way, the mobile phone of the first exemplary embodiment of the present invention becomes further safe. It is possible to adopt such configuration that it is possible to cancel the inhibition of use of the mobile phone by proceeding, for example, on the Web site of a manufacturer or a carrier, or in a shop.

In the mobile phone 1 of the first exemplary embodiment, it is also acceptable to use a part of digits of the PIN code for a second stage as the PIN code for a first stage. In this case, the PIN code for a first stage is compared with the part of digits of the four-digit PIN code for a second stage stored in the memory means 106. Thereby, the mobile phone 1 can save a storage area of the PIN code. The user can reduce the digit number of the PIN code to be stored. The user can omit partly the troublesome operation of registering a PIN code into the mobile phone 1.

6. Second Exemplary Embodiment

In a mobile phone of a second exemplary embodiment of the present invention, a part of digits of a four-digit PIN code is used as a simplified PIN code.

A functional block diagram of the mobile phone of the second exemplary embodiment is the same as that of FIG. 1.

An outside drawing of the mobile phone of the second exemplary embodiment is the same as that of FIG. 2.

Figure 6:
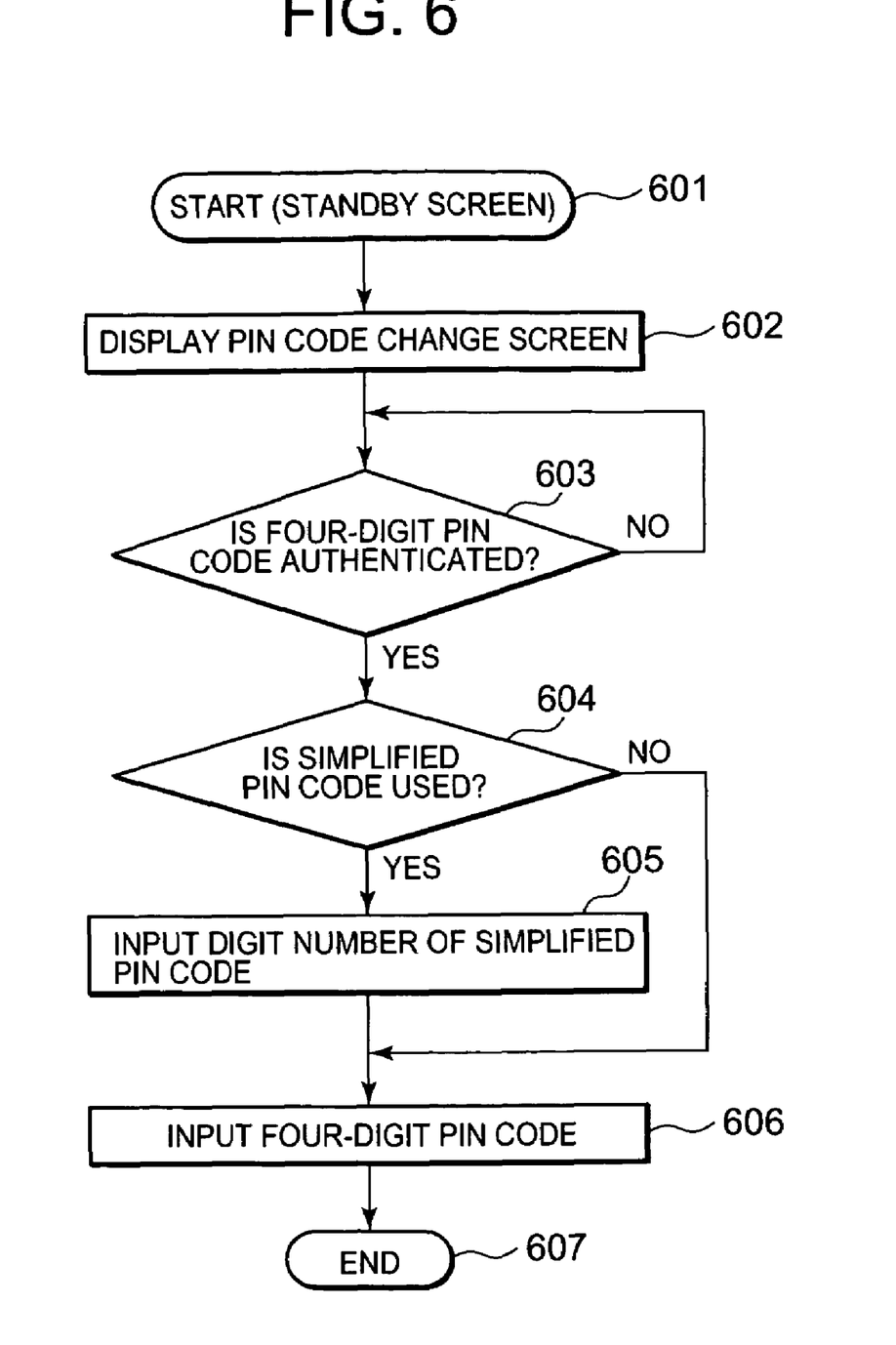
FIG. 6 is a flow chart explaining a process for setting a PIN code in a mobile phone according to a second exemplary embodiment of the present invention.
Figure 7A:
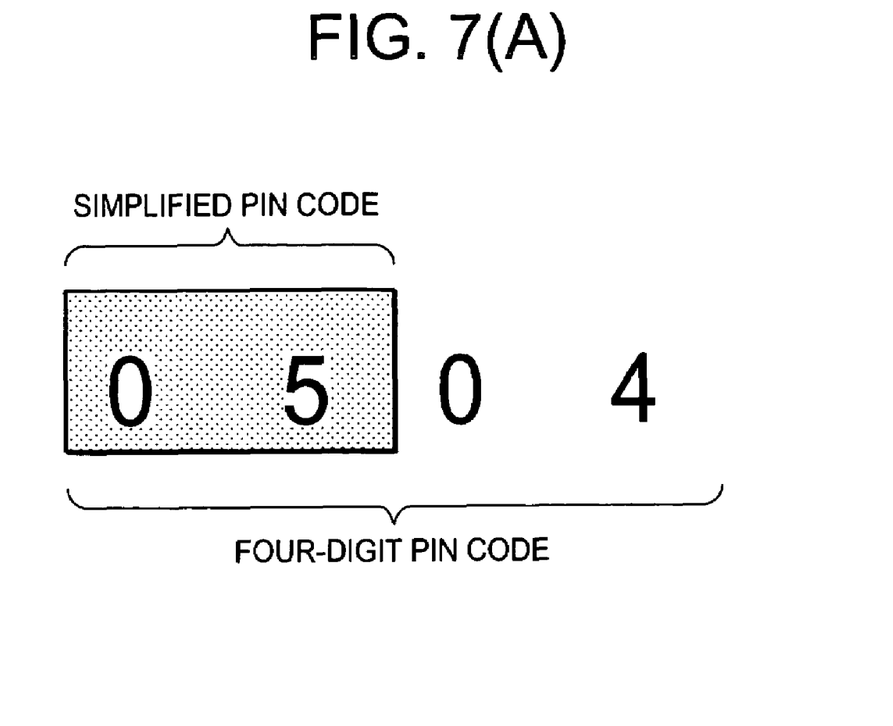
FIGS. 7(A)-7(D) explain which two digits of a four-digit PIN code are used for a simplified PIN code in a mobile phone according to a second exemplary embodiment of the present invention.
Figure 7B:
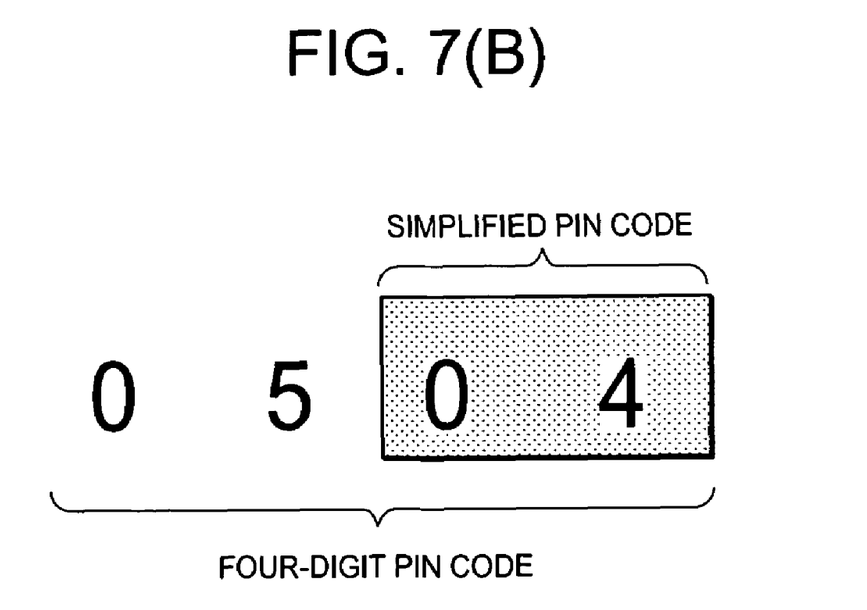
Figure 7C:
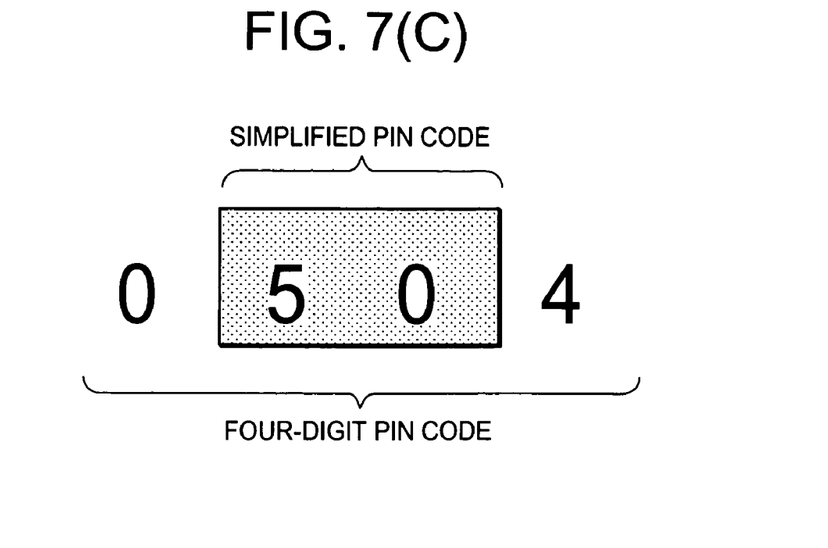
Figure 7D:
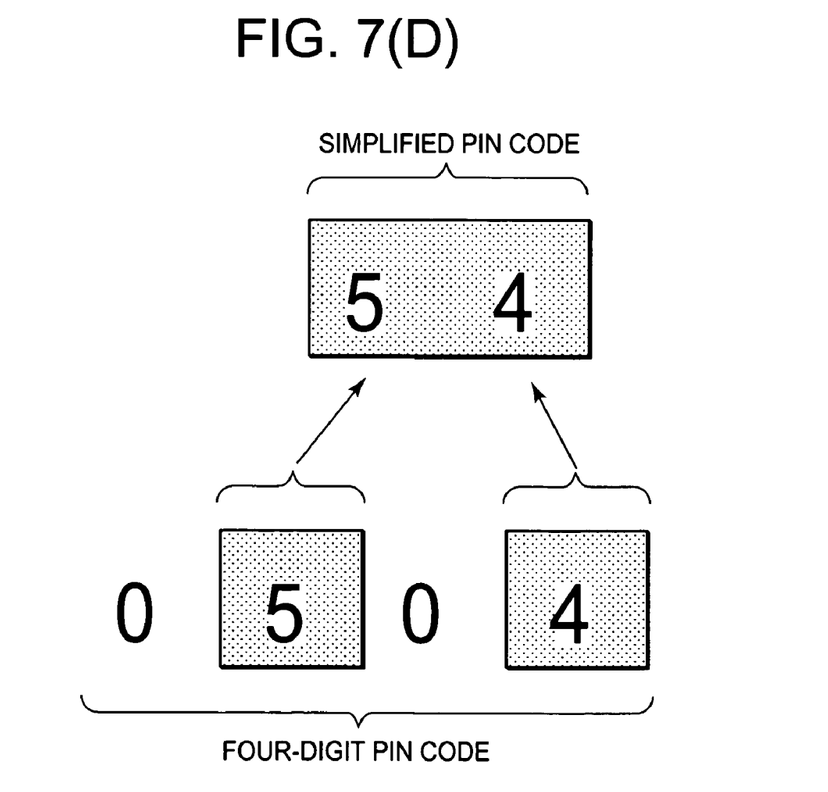

FIG. 6 is a flow chart explaining the processing for setting a PIN code in the mobile phone according to the second exemplary embodiment of the present invention.

In FIG. 6, the operation of the mobile phone of the second exemplary embodiment at the time when a PIN code is set by the user is the same as the operation of the mobile phone of the first exemplary embodiment at the time when a PIN code is set by the user, except step 605. When the user selects "Use" of a simplified PIN code (in the case of YES at step 604), it is desirable for a user to set and change the simplified PIN code anew, and hence, a screen which prompts the user to input the simplified PIN code is displayed on the display section 107 and, for example, the dial keys 209 are operated and one to three digits of the simplified PIN code are inputted. Then, the digit number of the inputted simplified PIN code is overwritten and stored into the second memory 106 to be changed (step 605).

A flowchart showing the processing at the time of the mobile phone of the second exemplary embodiment being locked is the same as that of FIG. 4.

A flowchart showing the processing at the time of the mobile phone of the second exemplary embodiment being unlocked when the simplified PIN code is set is the same as that of FIG. 5.

In the second exemplary embodiment, since the user does not need to determine a simplified PIN code apart from a four-digit PIN code, his/her setting of a PIN code is easy and his/her convenience is good. In addition, there exists an advantage that the user does not need to store a simplified PIN code apart from a four-digit PIN code.

The specific setting method of the simplified PIN code in the mobile phone of the second exemplary embodiment of the present invention will be described.

FIGS. 7(A) to 7(D) explain which two digits of a four-digit PIN code are used for the simplified PIN code in a mobile phone according to the second exemplary embodiment of the present invention. In an example in FIG. 7 (A), in the mobile phone of the second exemplary embodiment of the present invention, when a user inputs the digit number of the simplified PIN code as 2, the leftmost two digits of the four-digit PIN code are used as the simplified PIN code. However, in this case, it is also sufficient to adopt such configuration that the rightmost two digits of the four-digit PIN code is used as the simplified PIN code (FIG. 7 (B)), or to adopt such configuration that the center two digits of the four-digit PIN code is used (FIG. 7(C)). Alternatively, it is also sufficient to adopt such configuration that the combination of any two digits, which do not always adjoin each other, among the four-digit PIN code is used as the simplified PIN code (e.g., FIG. 7(D)). It is also sufficient to make it possible that a user selects arbitrarily which digits of the four-digit PIN code are used as the simplified PIN code. In this case, it is good to provide a step of making a user select which digits of the four-digit PIN code immediately after the process step 606 shown in FIG. 6.

7. Third Exemplary Embodiment

In a third exemplary embodiment of the present invention, when a part of functions among a plurality of functions which a mobile phone has are locked, the functions to be locked are not determined and fixed beforehand, but a user can set which functions are locked.

A functional block diagram of the mobile phone of the third exemplary embodiment is the same as that of FIG. 1.

An outside drawing of the mobile phone of the third exemplary embodiment is the same as that of FIG. 2.

A flowchart showing the processing at the time of a user setting the PIN code in the mobile phone of the third exemplary embodiment is the same as that of FIG. 3 or 6.

A flowchart showing the processing at the time of the mobile phone of the third exemplary embodiment being locked is the same as that of FIG. 4.

A flowchart showing the processing at the time of the mobile phone of the third exemplary embodiment being unlocked when the simplified PIN code is set is the same as that of FIG. 5.

The mobile phone of the third exemplary embodiment of the present invention can set which function is locked, when the mobile phone is locked, separately from the processing at the time of the PIN code being set (FIG. 3), the processing at the time of the mobile phone being locked (FIG. 4), and the processing at the time of a lock being released when the simplified PIN code is set (FIG. 5).

Figure 8:
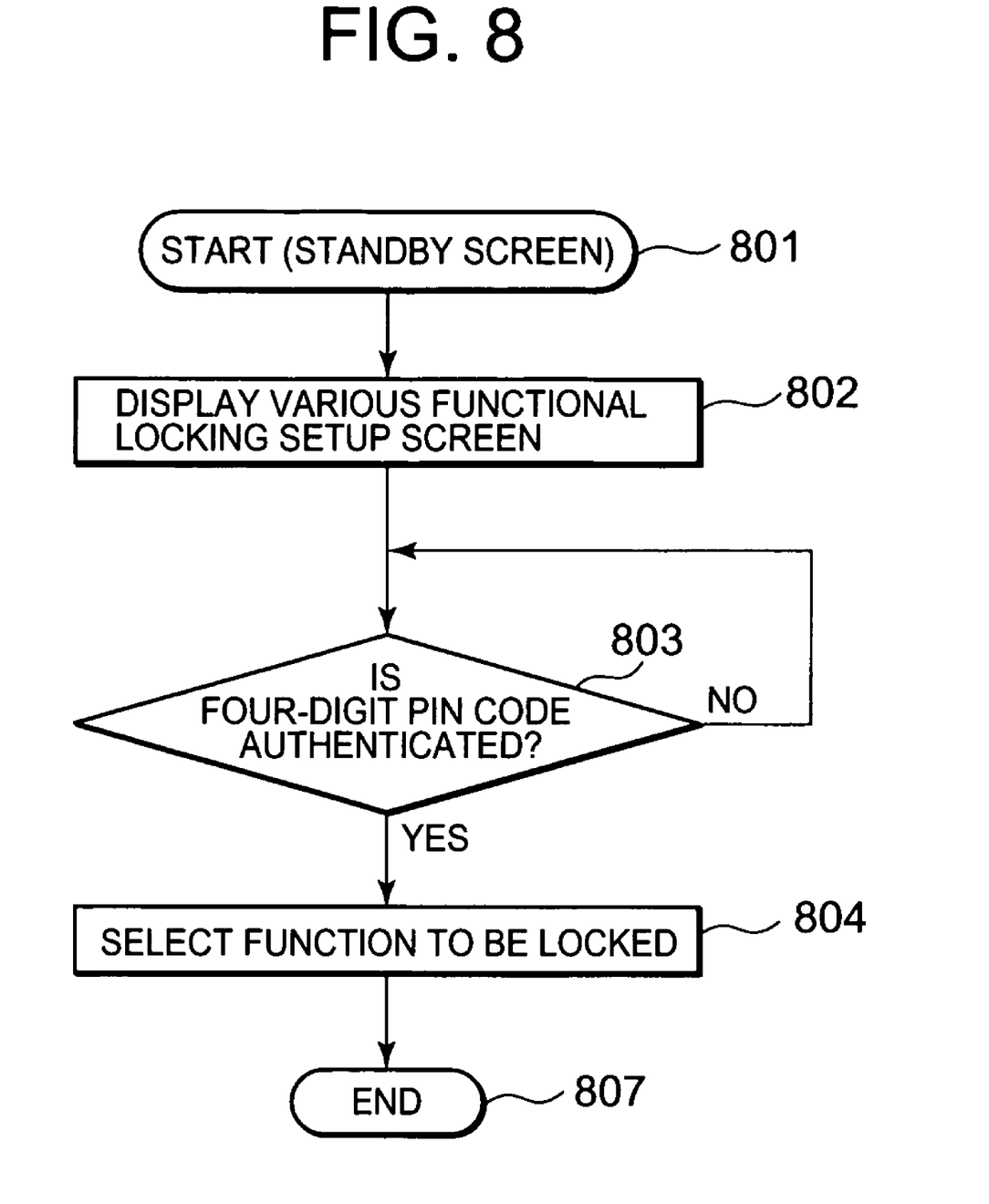
FIG. 8 is a flow chart explaining a process for setting functions to be locked according to a third exemplary embodiment of the present invention.

FIG. 8 is a flow chart explaining a process for setting functions to be locked according to a third exemplary embodiment of the present invention. However, the processing shown in FIG. 8 is absolutely the setting of which function to lock, and the locking itself is shown in FIG. 4.

When the user of the mobile phone 1 pushes the menu button 207, the menu screen is displayed on the display section 107. When the user operates a predetermined key, for example, the selection button 204 or dial keys 209 to select a function of selecting from a list which function is locked when the mobile phone 1 is locked, after the four-digit PIN code stored in the second memory 106 is copied into the first memory 105, a screen which prompts the user to input the four-digit PIN code is displayed on the display section 107 (step 802). At step 802, for example, when the dial keys 209 are operated and the four-digit PIN code is inputted, the inputted four-digit PIN code is stored in the first memory 105, and the inputted four-digit PIN code is compared with the four-digit PIN code copied in the first memory 105 (step 803).

When both do not coincide (in the case of NO at step 803), the screen which prompts the user to input the four-digit PIN code is again displayed on the display section 107 (step 803).

When both coincide (in the case of YES at step 803), the list of the functions which can be locked is displayed on the display section 107. The function to be locked is selected from these functions by the user operating a predetermined key, for example, the selection button 204 or dial keys 209 (step 804). The selected function is stored into the second memory 106 and the setting processing of which function to lock ends (step 807).

In the mobile phone of the third exemplary embodiment of the present invention, before making a user select a desired function to be locked (step 804), the screen which prompts the user to input the four digit PIN code is displayed on the display section 107 (step 803). However, since the selection itself of which function to lock is not so important on security, it is acceptable to skip the step 803 of requesting a user to input the four-digit PIN code. Or, in the case of the mode of using the simplified PIN code, at step 803, it is also acceptable to request a user to input the simplified PIN code instead of requesting the user to input the four-digit PIN code.

8. Fourth Exemplary Embodiment

In the mobile phones of the first exemplary embodiment of the present invention and the second exemplary embodiment, functions to be locked when the mobile phone is locked are fixed even if they are all or a predetermined part of functions of the mobile phone. In addition, in the mobile phone of the third exemplary embodiment of the present invention, a user can select which function is to be locked when the mobile phone is locked. Nevertheless, in any case, in these mobile phones, the functions to be locked are locked (FIG. 3) and unlocked (FIG. 5) in a lump. For this reason, it is not possible individually to set for respective functions whether a simplified PIN code is used, what is used as a four-digit PIN code, or what is used as a simplified PIN code when the simplified PIN code is used. Against these, in the mobile phone of a fourth exemplary embodiment of the present invention, a user can lock and unlock each function, and can set a simplified PIN code and a four-digit PIN code, which are different, every function. Thereby, in the mobile phone of the fourth exemplary embodiment of the present invention, it is possible to set in detail whether a simplified PIN code is used, what is used as a four-digit PIN code, or what is used as a simplified PIN code when the simplified PIN code is used, according to the importance of each function.

A functional block diagram of the mobile phone of the fourth exemplary embodiment is the same as that of FIG. 1.

An outside drawing of the mobile phone of the fourth exemplary embodiment is the same as that of FIG. 2.

A flowchart showing the processing at the time of a user setting the PIN code in the mobile phone of the fourth exemplary embodiment is the same as that of FIG. 3. However, it differs from the first exemplary embodiment that this processing is performed every function. Thus, in FIG. 3, a standby screen is displayed on the display section 107 (step 301). At step 301, when the user of the mobile phone 1 pushes the menu button 207, a menu screen is displayed on the display section 107. Further, when the user operates a predetermined key, for example, the selection button 204 or dial keys 209 and a change function of a PIN code of a certain function, for example, a telephone directory function is selected, a screen for changing the PIN code of the telephone directory function is displayed on the display section 107 (step 302). The next processing is the same as that of the first exemplary embodiment.

A flowchart showing the processing at the time of the mobile phone of the fourth exemplary embodiment being locked is the same as that of FIG. 4. However, it differs from the first exemplary embodiment that this processing is performed every function. Thus, in FIG. 4, a standby screen is displayed on the display section 107 (step 401). At step 401, when the user of the mobile phone 1 pushes the menu button 207, the menu screen is displayed on the display section 107. Further, when the user operates a predetermined key, for example, the selection button 204 or dial keys 209, a screen for locking a certain function of the mobile phone, for example, a telephone directory function, for example, a screen such as "If locking the telephone directory function, press 1, or if not, press 2" is displayed (step 402). The next processing is the same as that of the first exemplary embodiment.

A flowchart showing the processing at the time of the mobile phone of the fourth exemplary embodiment being unlocked when the simplified PIN code is set is the same as that of FIG. 5. However, it differs from the first exemplary embodiment that this processing is performed for every function. Thus, in FIG. 5, a standby screen is displayed on the display section 107 (step 501) At step 501, when the user of the mobile phone 1 pushes the menu button 207, a menu screen is displayed on the display section 107. Furthermore, when a function selected by the user operating a predetermined key, for example, the selection button 204 or dial keys 209 is locked with the PIN code, that is, the PIN code is set (step 502), the processing at steps 502 to 507 is performed.

When the PIN code which the user inputs here is locked in the mode of the selected function, for example, the telephone directory function using a simplified PIN code, the processing at steps 503, 504, 505 and 507, or steps 503, 504, 505, 506, and 507 in FIG. 5 is executed. On the other hand, when locked in the mode of not using a simplified PIN code, the processing at steps 503, 506, and 507 is executed. Thus, in the fourth exemplary embodiment, it is possible to set whether a simplified PIN code is used or not, in every function of the mobile phone. When using a simplified PIN code, it is possible to set the simplified PIN code and a four-digit PIN code every function. In addition, when not using a simplified PIN code, it is possible to set a four-digit PIN code every function of the mobile phone.

At step 501, when a function selected by the user operating a predetermined key, for example, the selection button 204 or dial keys 209 is not locked with the PIN code, that is, the PIN code is not set, steps 502 to 507 are omitted, and the processing ends (step 508).

Each of the above-mentioned exemplary embodiments is only an example of preferable exemplary embodiments of the present invention. The present invention can be implemented by modifying each of the above-mentioned exemplary embodiments, and/or combining the above-mentioned exemplary embodiments.

Each of the above-mentioned exemplary embodiments is an example of applying the present invention to a mobile phone. The present invention can be adopted in not only a mobile phone but also all portable apparatuses such as a PHS (Personal Handyphone System), a PDA (Personal Data Assistant), a handheld game machine, and a portable music player.

In each of the above-mentioned exemplary embodiments, the case that a one- to three-digit PIN code is used as a PIN code for a first stage, and a four-digit PIN code is used as a PIN code for a second stage, respectively is mainly described as an example. However, the PIN code for a first stage of the present invention does not always need to be one- to three-digits, and the digit number of the PIN code for a second stage does not always need to be four. What is necessary is just that the PIN code for a first stage is shorter than the PIN code for a second stage.

In each of the above-mentioned exemplary embodiments, the PIN code which is composed of a number is mainly described as an example. However, PIN codes may be numbers, symbols, alphabetical letters, characters of other languages, or combination of them.

The previous description of these embodiments is provided to enable a person skilled in the art to make and use the present invention. Moreover, various modifications to the embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

What is claimed is:

1. A method of unlocking at least one of functions provided to a portable apparatus, comprising:
   judging whether or not a predetermined first code is entered;
   second judging whether or not a predetermined second code is entered, wherein the character length of said predetermined first code is shorter than the character length of said predetermined second code, if said predetermined first code is not entered; and unlocking said one of functions provided to said portable apparatus, if said predetermined first or second code is entered.

2. The method of unlocking at least one of functions provided to a portable apparatus according to claim 1, wherein characters of said predetermined first code are identical to designated several characters included in said predetermined second code.

3. The method of unlocking at least one of functions provided to a portable apparatus according to claim 2, wherein said designated several characters of said predetermined first code are consecutive characters in sequence of characters included in said predetermined second code.

4. The method of unlocking at least one of functions provided to a portable apparatus according to claim 3, wherein said consecutive characters are leftmost characters of said predetermined second code.

5. The method of unlocking at least one of functions provided to a portable apparatus according to claim 3, wherein said consecutive characters are rightmost characters of said predetermined second code.

6. The method of unlocking at least one of functions provided to a portable apparatus according to claim 3, wherein said consecutive characters are center characters of said predetermined second code.

7. The method of unlocking at least one of functions provided to a portable apparatus according to claim 1, wherein said character is a numeral number.

8. The method of unlocking at least one of functions provided to a portable apparatus according to claim 1, wherein said portable apparatus is a mobile phone.

9. The method of unlocking at least one of functions provided to a portable apparatus according to claim 1, wherein sequence of characters included in said predetermined first and second codes is changeable to another sequence of characters.

10. The method of unlocking at least one of functions provided to a portable apparatus according to claim 1, wherein each different sequence of characters included in said predetermined first and second codes is assignable to each of said functions provided to said portable apparatus, respectively.

11. The method of unlocking at least one of functions provided to a portable apparatus according to claim 1, wherein each different sequence of characters included in said predetermined first and second codes is assignable to each of selected plurality of functions among said functions provided to said portable apparatus.

12. The method of unlocking at least one of functions provided to a portable apparatus according to claim 1, further comprising;
selecting an unlocking mode wherein said predetermined first code is not used.

13. A portable apparatus with plurality of functions, comprising:
a controlling means for setting a first code and a second code; and
a storing means for storing said first code and said second code,
wherein said controlling means judges whether or not said first code is entered;
said controlling means judges whether or not said second code is entered, wherein the character length of said first code is shorter than the character length of said second code, if said first code is not entered; and
said controlling means unlocks at least one of functions provided to said portable apparatus, if said first or second code is entered.

14. The portable apparatus with plurality of functions according to claim 13, wherein characters of said first code are identical to designated several characters included in said second code.

15. The portable apparatus with plurality of functions according to claim 14, wherein said designated several characters of said first code are consecutive characters in sequence of characters included in said second code.

16. The portable apparatus with plurality of functions according to claim 15, wherein said consecutive characters are leftmost characters of said second code.

17. The portable apparatus with plurality of functions according to claim 15, wherein said consecutive characters are rightmost characters of said second code.

18. The portable apparatus with plurality of functions according to claim 15, wherein said consecutive characters are center characters of said second code.

19. The portable apparatus with plurality of functions according to claim 13, wherein said character is a numeral number.

20. The portable apparatus with plurality of functions according to claim 13, wherein said portable apparatus is a mobile phone.

21. The portable apparatus with plurality of functions according to claim 13, wherein sequence of characters included in said first and second codes is changeable to another sequence of characters.

22. The portable apparatus with plurality of functions according to claim 13, wherein each different sequence of characters included in said first and second codes is assignable to each of said functions provided to said portable apparatus, respectively.

23. The portable apparatus with plurality of functions according to claim 13, wherein each different sequence of characters included in said first and second codes is assignable to each of selected plurality of functions among said functions provided to said portable apparatus.

24. The portable apparatus with plurality of functions according to claim 13,
wherein said controlling means selects an unlocking mode wherein said first code is not used.

* * * * *